…

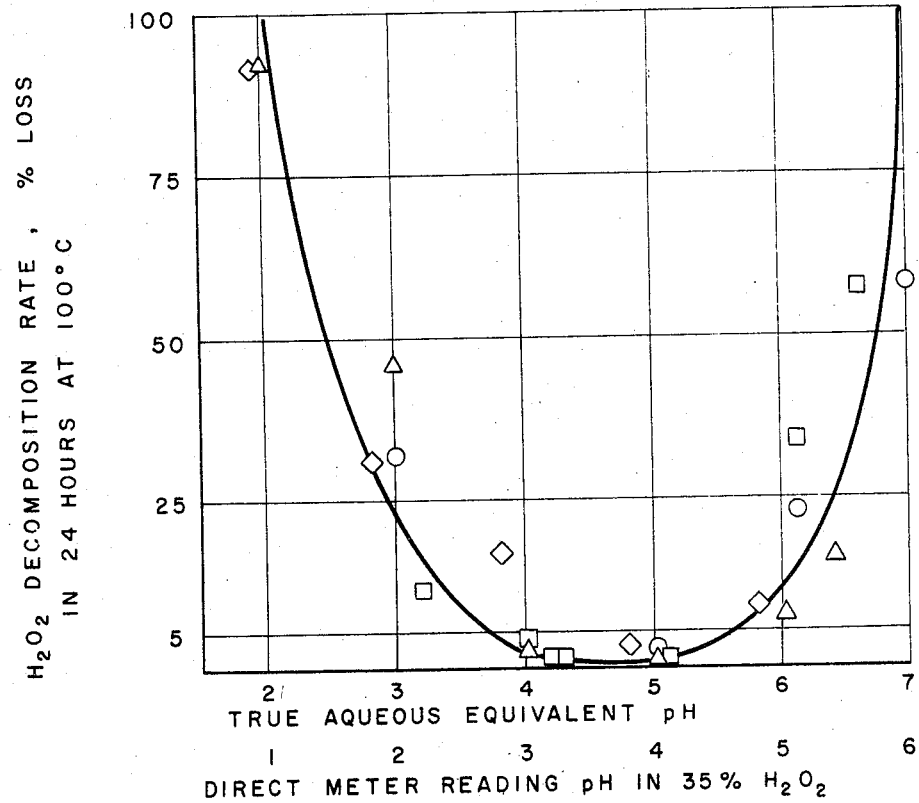

United States Patent Office 3,208,825
Patented Sept. 28, 1965

---

3,208,825
STABILIZATION OF HYDROGEN PEROXIDE
Robert E. Meeker, Berkeley, Calif., assignor to Shell Oil Company, New York, N.Y., a corporation of Delaware
Filed June 28, 1962, Ser. No. 206,072
10 Claims. (Cl. 23—207.5)

This application is a continuation-in-part of application S.N. 777,209 filed December 1, 1958, and now abandoned.

This invention relates to aqueous solutions of hydrogen peroxide, stabilized against undesirable loss by decomposition or other means during storage, shipment, processing or other use.

It has long been the practice to add stabilizers to commercial hydrogen peroxide solutions. A large number of different compounds have been proposed at various times for this purpose. Inorganic stabilizers such as sodium pyrophosphate, sodium stannate and sodium nitrate have been most widely used. The organic stabilizers previously suggested are generally subject to attack by the peroxide. As a result, even when they are effective they have a life which is too short to make them practical except in very highly dilute peroxide solutions such, for instance, as 10 volume (3%) hydrogen peroxide. Even the widely used inorganic stabilizers are not as effective under all circumstances as would be desirable. Thus, for example, sodium pyrophosphate hydrolyzes rapidly in 35% hydrogen peroxide at 100° C. to orthophosphate, which is very much less effective as a stabilizer so the useful life is only a few hours in such solutions at high temperatures. Sodium stannate, on the other hand, is a superior and long-lived stabilizer for 35% hydrogen peroxide in glass containers but is often quite short-lived in the aluminum containers customarily used for quantity storage of commercial peroxide. Also, the conventional stabilizers are considered harmful in some end uses of the stabilized peroxide solutions. For example, in the epoxidation of certain oils by peroxide, stannate and nitrate are considered injurious to the quality of the epoxidized oil.

An important object of the present invention is the provision of stabilized hydrogen peroxide compositions which are not subject to the foregoing disadvantages. Another object is the provision of a new method of stabilizing hydrogen peroxide which is effective with hydrogen peroxide of all concentrations and at high temperatures as well as ordinary temperatures. Still another object is to provide hydrogen peroxide stabilized with an organic stabilizer which is highly resistant to attack by hydrogen peroxide of even high concentration at 100° C. or higher. A further object is the provision of hydrogen peroxide stabilizers having a long effective life. A special object is to provide hydrogen peroxide protected against decomposition during high-temperature processing or other use. Still other objects and advantages of the invention will be apparent from the following description of the invention, in which its more advantageous modifications will be emphasized without any intent of limiting the scope of the invention.

According to the invention of copending application Serial No. 777,209, filed December 1, 1958 of which the present application is a continuation-in-part decomposition of hydrogen peroxide is minimized by adding a stabilizing amount of a water-soluble poly(N,N-dicarboxyalkyl)amine having a special structure which is highly resistant to attack by even highly concentrated hydrogen peroxide at elevated temperatures and which also makes these compounds highly effective stabilizers of hydrogen peroxide. The characteristic structure which is necessary in these stabilizers is a saturated carbocyclic ring having at least two adjacent ring carbon atoms each directly linked to different N,N-dicarboxyalkylamino groups in which the alkyl contains not more than two carbon atoms, advantageously N,N-dicarboxymethylamino groups. Particularly advantageous stabilization is obtained when the stabilizers are present as salts in which only a controlled proportion of the —COOH radicals of the

—N(RCOOH)$_2$ groups, where R is an alkylene radical of 1 to 2 carbon atoms are in the form of salts. These salts are the partial salts in which the proportion of the carboxylic acid groups neutralized corresponds to that for a pH in the hydrogen peroxide within the acid range pointed out in said application as providing a substantial advantage over stabilization at higher or lower pH values. Thus the present invention comprises stabilization of aqueous hydrogen peroxide with a water-soluble partial salt of a N,N-(dicarboxyalkyl) amino-substituted carbocyclic compound having a saturated carbocyclic ring with at least two adjacent ring carbon atoms each directly linked to the nitrogen atom of a group of the formula

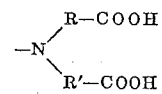

in which R and R' represent alkylene radicals of 1 to 2 carbon atoms, the proportion of carboxylic acid groups neutralized being such that the pH of the solution corresponds to about 2.0 to 5.0 in 35% peroxide. Included in the invention are hydrogen peroxide compositions thus stabilized, particularly desirable being those containing a stabilizing amount of a water-soluble carbocyclic polyamine having at least two adjacent carbon atoms of a saturated ring directly linked to —N(CH$_2$COOM)$_2$ groups in which M represents a cation, a portion of which cations are hydrogen while the remainder are cations which do not catalyze hydrogen peroxide decomposition, for example, alkali metal or alkaline earth metal or ammonium ions.

It was surprising to find that dicarboxyalkylamine-substituted polyamine partial salts of the foregoing configuration were outstandingly effective as stabilizers for hydrogen peroxide not only in comparison wtih the free acid and completely neutralized forms of the same compounds but also compared wtih other types of compounds. They have a much longer useful life than the related open-chain compounds, including ethylenediamine tetraacetic acid. Apparently the carbocyclic rings which characterize the stabilizers of the invention introduce stearic hindrance or otherwise make the stabilizers of the invention different in their action from the corresponding aliphatic compounds in which the groups can rotate freely so that undesirable peroxide attack on the amino groups takes place more easily and converts the compound to a form ineffective for stabilization of peroxide. Whatever the explanation, the acidic partial salts of the carbocyclic stabilizers of the present invention have been found to be highly effective in hydrogen peroxide of all concentrations, not only at ordinary temperatures but also at the high temperature of 100° C. and more encountered in distillation and other processing and use of hydrogen peroxide solutions. They provide special advantages over the free acid form of the poly(N,N-dicarboxyalkylamino) carbocyclic compounds such, for instance, as 1,2-diaminocyclohexane tetraacetic acid which is recommended as a hydrogen peroxide stabilizer in U.S. Patent 2,961,306.

A wide variety of N,N-dicarboxyalkylamino-substituted polyamine partial salts can be used as stabilizers according to the present invention. Their saturated carbocyclic rings can be single or fused rings which can be substituted or not. Particularly useful partial salts are those having the dicarboxyalkyl-substituted amino groups linked to adjacent ring carbon atoms of single saturated hydrocarbon rings of 4 to 9 carbon atoms. Partial salt stabilizers having the dicarboxyalkyl amino groups linked to the carbon atoms of a fused-ring structure advantageously have from 7 to 20 carbons in the fused rings. Typical examples of unsubstituted acids whose partial salts are useful stabilizers are, for example, the cycloalkane compounds: 1,2 - diaminocyclobutane-N,N'-tetrapropionic acid; 1,2-diaminocyclopentane-N,N-tetraacetic acid; 1,2-diaminocycloheptane-N,N'-tetraacetic acid; and 1,2 - diaminocyclononane - N,N' - tetraacetic acid. Representative of the new partial salt stabilizers having fused cycloalkane rings are those of acids such as 2,3-diaminodecahydronaphthalene-N,N'-tetraacetic acid; 2,3-diaminoperhydroanthracene-N,N'-tetraacetic acid; 2,3-diamino-1,4-methanocyclohexane-N,N'-tetraacetic acid; and the like. U.S. Patent 2,519,708 describes methods which are suitable for making these acids.

Partial salts of ring-substituted compounds of the foregoing types which can also be used successfully include not only the partial salts which have substituents which are inert to the peroxide being stabilized but also those with substituents which are oxidized by the peroxide without rupture of the ring. Since only relatively small amounts of the stabilizer are ordinarily required, the loss of peroxide from oxidation of ring substituents on the stabilizer will be negligible. Thus one can successfully use as stabilizers partial salts of N,N-dicarboxymethylamino-substituted saturated carbocyclic polyamines having substituents such as carbonyl groups, carboxyl groups, alkyl groups and the like on one or more ring carbon atoms. When 1,2 - diaminocyclopentane - 3 - carboxaldehyde-N,N'-tetraacetic acid partial salts are added as a stabilizer to 35% hydrogen peroxide, the aldehyde group is converted at least in substantial part to a carboxyl group when the stabilized peroxide is heated at 100° C. but this oxidation product is also a very effective stabilizer for the peroxide so excellent stabilization is obtained over very long periods of time. Similarly the carboxyl groups present in the partial salts are partially converted by the peroxide into peracid groups, but this does not destroy the effectiveness of the stabilizer. Examples of alkyl-substituted ring compounds whose partial salts are suitable for use in the invention include 1,2-diamino-1-methylcyclohexane-N,N'-tetraacetic acid; 1,2-diamino-3-methylcyclopentane-N,N'-tetrapropionic acid; 1,2-diamino-3-n-propylcyclohexane-N,N'-tetraacetic acid; 2,3-diamino - 6 - methylperhydronaphthalene - N,N' - tetraacetic acid; 1,2-diamino-3,4-dimethylcyclohexane-N,N'-tetraacetic acid; 1,2-diamino-3,5-dimethylcyclohexane-N,N'-tetraacetic acid; and 1,2-diamino-3-methyl-4-ethylcyclopentane-N,N'-tetraacetic acid.

The alkyl substituents on the ring carbon atoms of the new partial salt stabilizers can themselves be substituted, although as a general rule this makes the stabilizer more expensive than the preferred compounds having unsubstituted or alkyl-substituted carbocyclic rings and does not provide compensating advantages. Thus hydroxy, keto, aldehyde, ether, acid and ester and like-substituted alkyl groups can be present in the stabilizers without interfering with their effectiveness.

The stabilizers used can have more than the two —N(RCOOM)₂ groups linked to the saturated carbocyclic ring which characterizes the new stabilizing agents of the invention. These groups may be on ring carbon atoms which are adjacent to the two essential

—N(RCOOM)₂ groups in ortho positions to each other or may be further removed. Typical stabilizers of this type are partial salts of acids such as, 1,2,3-triaminocyclobutane-N,N',N" hexaacetic acid; 1,2,4-triaminocyclopentane-N,N',N"-hexaacetic acid; 1,2,3,4-tetraaminocyclohexane-N,N',N", N"'-octaacetic acid; 2-carboxyl-1,3,4-triaminocyclohexane-N,N,N"-hexaacetic acid; 2,3,6,7-tetraaminodecahydronaphthalene-N,N',N",N"'-octaacetic acid; and the like.

Halogen-substituted compounds of the foregoing types, especially those with fluoro-, chloro- or bromo-substituents, particularly on the ring carbon atoms, are another class of partial salt stabilizers which can be successfully used with hydrogen peroxide according to the invention. Representative examples of the acids of this type whose partial salts are effective stabilizers are 1,2-diaminoperfluorocyclopentane-N,N'-tetraacetic acid; 4-chloro-1,2-diaminocyclopentane-N,N'-tetraacetic acid; 1,2-diaminoperfluorocyclohexane-N,N'-tetraacetic acid; 2,3-dichloro-1,4 - methano - 5,6 - diaminocyclohexane - N,N',N',N'-tetraacetic acids; 2,3-dichloro-1,4,5,8-exo,endo-dimethano - 6,7 - diaminodecahydronaphthalene; 5,6 - dichloro-4,7 - methano - 1,2 - diaminooctahydroindene - N,N,N', N'-tetraacetic acid; 1-fluoromethyl-2,3-diaminoperfluorocyclohexane-N,N'-tetraacetic acid; and the like.

As previously indicated it is necessary that the partial salts used be those which correspond to a pH in the hydrogen peroxide solution of about 2.0 to 5.0 in 35% peroxide. The pH here referred to is the apparent pH of the solution or that shown by direct reading of a pH meter. It differs from the "true aqueous pH" of the solution by a known correction, the value of which varies with the peroxide strength. Values of this correction as a function of peroxide strength have been published, for example, by J. R. Kolczynski et al. in the Journal of the American Chemical Society, Volume 79, page 531 (1957). The relationship between these two methods of expressing the pH of aqueous 35% w. hydrogen peroxide is shown by the two scales given for the abscissas plotted in the attached drawing.

The new stabilizers can be added to the peroxide as the free carboxylic acid or as neutral salts of the acid and then converted to the required partial salt forms or the preformed partial salts can be added. The solubility of the new stabilizers in the aqueous hydrogen peroxide to be stabilized is improved because of the presence of carboxy groups in the salt form. The alkali metal salts are especially preferred, but ammonium, alkaline earth, aluminum, zinc and like salts of cations which are inert to peroxides can also be used. Salts of monovalent ions are most suitable.

The amount of N,N-dicarboxyalkyl-substituted saturated carbocyclic polyamine partial salt stabilizer which it will be most advantageous to employ will depend upon the purity of the hydrogen peroxide being stabilized and the conditions of storage and usage under which the stability is to be maintained. The purer the peroxide and the lower the temperature to which it is to be exposed, the smaller is the amount of partial salt stabilizer which will be satisfactory. As a general rule an amount of partial salt stabilizer between about 1 and about 1000 milligrams per liter of peroxide solution will be suitable but most preferably amounts between about 3 and about 250 milligrams per liter are used.

The new partial salt stabilizers may be used alone or in combination with any of the other known inorganic or organic stabilizers of hydrogen peroxide. Thus the usual stabilizer formulations including pyrophosphate, orthophosphate, stannate, nitrate and the like can be employed with the new stabilizers. The same range of concentrations previously described as desirable for the new stabilizers are advantageous whether or not other stabilizers are used. One especially advantageous method comprises use of the new stabilizer in the free acid form together with sufficient of a basic reacting stabilizer such as sodium pyrophosphate or the like to give the desired pH. In this way the total residue in the peroxide solution can be minimized, because the only substances added to the peroxide are active stabilizers. In contrast, in the usual stabilizer formulations using pyrophosphate or stannate or both, all the stabilizers are alkaline and are neutralized with an acid such as phosphoric acid which adds to the residue but which itself has little or no stabilizing ability. Hydrogen peroxide of any concentration can be stabilized with the new partial salt stabilizers, good results being obtained with $H_2O_2$ of about 1% to about 90% weight concentration or higher.

The following examples illustrate the superiority of the new stabilizers over the conventional formulation of inorganic stabilizers.

*Example I*

A sample of 35% w. hydrogen peroxide was stabilized with 110 mg. per liter of sodium pyrophosphate $$(Na_4P_2O_7)$$

plus 26 mg. per liter of sodium stannate [$Na_2Sn(OH)_6$] and 30 mg. per liter of sodium nitrate ($NaNO_3$). The apparent or direct reading pH was adjusted to 2.5 with phosphoric acid, and the sample was stored in a 30-gallon aluminum drum. After several weeks at ambient temperature the decomposition rate of aliquots of the peroxide as measured by the usual oxygen evolution method had increased from less than 2% per day (24 hours) at 100° C. to 33% per day at 100° C. Fifty milligrams per liter of 1,2 - diaminocyclohexane - N,N' - tetraacetic acid was added to an aliquot and converted to the partial ammonium salt with readjustment of the apparent pH to 2.5 with $NH_4OH$. This reduced the decomposition rate to 1.1% per day at 100° C. and maintained this low decomposition rate throughout an extended test period of two weeks at 100° C.

*Example II*

The effectiveness of the new partial salt stabilizers at very small concentrations is shown by the following tests in which 1,2 - diaminocyclohexane - N,N'-tetraacetic acid was converted to the diammonium salt and added at the 10 mg. per liter concentration level to another aliquot of the unstable peroxide from Example I and the apparent pH was readjust to 2.5 corresponding to a true aqueous equivalent pH of 3.5. The peroxide decomposition rate was reduced to 1.3% per day at 100° C. The long life of the stabilizer is shown by the fact that the decomposition rate had risen only to 1.6% per day at 100° C. after four days at 100° C.

*Example III*

A sample of 50% w. hydrogen peroxide was stabilized with 165 mg. per liter of $Na_4P_2O_7$ and 45 mg. per liter of $NaNO_3$ and stored at apparent pH 1.9 at ambient temperature in a 30-gallon aluminum drum. After several weeks the peroxide decomposition rate had risen to 5.3% per day at 100° C. The addition of 50 mg. per liter of 1,2-diaminocyclohexane-N,N'-tetraacetic acid which was converted to the partial salt with readjustment of the apparent pH with ammonium hydroxide to 1.9 corresponding to a true aqueous equivalent pH of 3.4 reduced the decomposition rate to 0.8% per day at 100° C. This low rate was maintained throughout the test period of 49 hours at 100° C.

*Example IV*

A sample of 6% w. hydrogen peroxide with no inhibitor decomposed at the rate of 22% per day at 100° C. at an apparent pH of 4.0. The addition of 10 mg. per liter of 1,2-diaminocyclohexane-N,N'-tetraacetic acid partial ammonium salt with readjustment of the apparent pH to 4.0 or a true aqueous equivalent pH of about 4.1 reduced the decomposition rate to 3.0% per day at 100° C.

*Example V*

A sample of 90% w. hydrogen peroxide was deliberately contaminated with 0.005 mg. per liter iron and 0.002 mg. per liter copper, added as ferrous sulfate and as cupric sulfate, respectively. At an apparent pH of 0.5 the peroxide decomposed at the rate of 4.1% per day at 100° C. The addition of 3 mg. per liter of 1,2-diaminocyclohexane-N,N'-tetraacetic acid which was converted to the partial salt by means of NaOH with readjustment of the apparent pH to 0.5 or a true aqueous equivalent pH of about 5.3 reduced the decomposition rate to 2.9% per day at 100° C. The low rate was maintained throughout the test period for 24 hours at 100° C.

*Example VI*

The importance of using partial salts in the proper pH range is illustrated in the table below. Several aliquots of the unstable peroxide of Example I were each stabilized with 50 mg. per liter of 1,2-diaminocyclohexane-N,N'-tetraacetic acid and the apparent pH readings were adjusted as shown in the table with either $NH_4OH$ or $HNO_3$ as required.

| Apparent pH | True Aqueous Equivalent pH | $H_2O_2$ Decomposition Rate, percent per day at 100° C. |
|---|---|---|
| 1.5 | 2.5 | 0.55 |
| 2.0 | 3.0 | 0.12 |
| 2.5 | 3.5 | 1.1 |
| 3.1 | 4.1 | 1.2 |
| 3.6 | 4.6 | 1.0 |
| 4.3 | 5.3 | 1.2 |
| 5.0 | 6.0 | 17 |

For comparison, the blank without the new stabilizer decomposed at 33% per day at apparent pH 2.5 and at a substantially higher rate at apparent pH 5.0. While the stabilizer effected a considerable improvement in peroxide stability at each pH tested, a substantial advantage was obtained in the range of apparent pH above 2.0 but below 5.0 in the 35% w. peroxide. At apparent pH 1.5 and 2.0 the decomposition rate increased from the very low values shown to somewhat higher values after about 4 hours at 100° C. The higher decomposition rates were still substantially lower than the rates for the unstabilized peroxide, however. At pH values 2.5, 3.1, 3.6 and 4.3 the low decomposition rates were maintained unchanged throughout the test periods of five days or more at 100° C.

The attached drawing is a plot of results which show that with the partial salt stabilizers of the invention, optimum stabilization is obtained in the same pH range regardless of hydrogen peroxide concentration. The tests were carried out as in the foregoing examples using partial sodium salts of 1,2-diaminocyclohexane-N,N'-tetraacetic acid with different degrees of neutralization of the carboxylic acid groups as indicated by the pH of the resulting hydrogen peroxide solutions. Peroxide solutions of different strengths were made up by diluting with deionized water the same starting hydrogen peroxide of 90% concentration. In each case the peroxide solution contained 50 mg. 1,2-diaminocyclohexane-N,N'-tetraacetic acid, 110 mg. sodium pyrophosphate, 5 mg. dissolved aluminum, 0.10 mg. dissolved iron and 0.02 mg. dissolved copper. The attached drawing shows the loss of hydrogen peroxide which occurred in 24 hours of heating at 100° C. plotted against the pH of the solution expressed as aqueous equivalent pH which is the direct pH reading with a correction added which is a function of the hydrogen peroxide concentration as described by J. R. Kolczynski et al. in the journal article previously referred to. For comparison the direct pH meter reading for the 35% hydrogen peroxide solution where the correction is plus one is shown under the ordinates for true aqueous equivalent pH.

The results show that there is an important relationship between the extent of conversion of the polyamino-polycarboxylic acid compound to salt and its effectiveness as a stabilizer. By carrying out the conversion to salt only partially so that the pH of the mixture is maintained in the range equivalent to the pH of about 2 to about 5 in 35% $H_2O_2$ much superior results are obtained.

The following examples illustrate superiority of the alicyclic compounds of the invention over the related aliphatic compounds for the stabilization of hydrogen peroxide solutions.

*Example VII*

A 35% w. hydrogen peroxide solution decomposed at the rate of 7% per day at 100° C. at apparent pH 2.5. The alicyclic compound 1,2-diaminocyclohexane-N,N'-tetraacetic acid was added in the amount of 50 mg. per liter and converted to its partial sodium salt corresponding to an apparent pH 2.5. The decomposition rate was reduced to 1.1% per day at 100° C. and maintained this low rate without deviation throughout a test period of more than six days at 100° C. Several related aliphatic compounds, tested as partial salts under the same conditions, also improved the stability of the peroxide temporarily, but each of the aliphatic compounds was destroyed by the peroxide after only several hours at 100° C. After this brief period of temporary stabilization with the aliphatic compounds, the peroxide decomposition rate increased to a value substantially worse than if no stabilizer had been added at all. The best of the aliphatic compounds tested was the partial sodium salt of ethylenediamine-N,N'-tetraacetic acid. It temporarily reduced the decomposition rate of the above-mentioned peroxide solution to 1.3% per day at 100° C. However, the decomposition rate began to increase after only 24 hours at 100° C. and reached the value 12% per day after only 48 hours at 100° C. Diethylenetriamine-N,N',N''-pentaacetic acid partial sodium salt temporarily reduced the rate to a value corresponding to 1.2% per day but then the rate steadily increased and reached 11% per day after only 14 hours at 100° C. Similarly the rate with nitrilotriacetic acid partial sodium salt was momentarily reduced to 1.5% per day but increased to 14% per day after only four hours at 100° C. Likewise ethylenediamine-N-(beta-hydroxyethyl)-N,N'-triacetic acid and ethylenediamine-N,N'-di(o-hydroxyphenyl)acetic acid) partial sodium salts each reduced the hydrogen peroxide decomposition rate momentarily to 1.8% per day but the rate increased to 11% per day after only four hours at 100° C. for each compound.

*Example VIII*

In order to compare the alicyclic compounds of the invention with the best of the aliphatic compounds of Example VII under more severe test conditions, the hydrogen peroxide solution of Example VII was further contaminated by adding to it 0.02 mg. per liter of iron (added as ferrous sulfate) plus 0.01 mg. per liter of copper (added as cupric sulfate) so that the peroxide solution without organic stabilizers decomposed at the rate of 40% per day at 100° C. at apparent pH 2.5. The addition of 50 mg. per liter of 1,2-diaminocyclohexane-N,N'-tetraacetic acid partial sodium salt corresponding to an apparent pH 2.5 reduced the decomposition rate of this peroxide solution to 2.1% per day at 100° C. and maintained that low rate throughout the test period of four days at 100° C. In contrast, 50 mg. per liter of ethylenediamine-N,N'-tetraacetic acid partial salt corresponding to the same apparent pH 2.5 only momentarily reduced the peroxide decomposition rate to 2.8% per day. The rate gradually increased and reached the value 29% per day after only 16 hours at 100° C.

*Example IX*

In further illustration of the superiority of the partial salts of the alicyclic compounds of the invention over the partial salts of related aliphatic compounds, ethylenediamine-N,N'-tetraacetic acid was added to the 90% hydrogen peroxide solution of Example V in the proportion of 50 mg. per liter, and converted to partial salt by readjusting the apparent pH with sodium hydroxide to the value 0.5. The peroxide decomposition rate was momentarily diminished but then quickly increased. After only 40 minutes at 100° C. the peroxide decomposition rate surpassed that of the unstabilized peroxide solution.

The following are representative examples of other water-soluble partial salts of N,N-carboxyalkylamino-substituted carboxylic acids which give similar good results in the stabilization of hydrogen peroxide solutions under the indicated pH conditions: disodium 1,2-diaminocyclooctane-N,N'-tetraacetic acid; trisodium 1,2-diaminoperhydroanthracene-N,N'-tetraacetic acid; disodium 4-tert-butyl-1,2-diaminocyclohexane-N,N' - tetrapropionic acid; dipotassium 1,4-dicarboxy-2,3-diaminocyclohexane-N,N'-tetraacetic acid; monocalcium 4-carboxy-1,2,3-triaminobicycloheptane-N,N'',N'''-hexaacetic acid; disodium 1-chloromethyl - 2 - ethyl - 3,4 - diaminocyclopentane-N,N'-tetraacetic acid and disodium 1,2-perfluorocyclohexane-N,N'-tetraacetic acid.

Because of their unusual effectiveness and resistance to oxidation to ineffective forms, the new partial salt stabilizers are not only useful in the storage and shipment of hydrogen peroxide solutions of all concentrations in any of the customary types of containers, but also are outstanding for stabilization of the peroxide during processing and use. Thus, for example, in the manufacture, recovery and concentration of hydrogen peroxide it is often desirable to subject the peroxide to high temperatures. This has caused appreciable loss of peroxide, especially where streams of crude peroxide containing substantial amounts of impurities which tend to catalyze hydrogen peroxide decomposition were heated for relatively long periods.

By addition of the new partial salt stabilizers to such peroxide solutions at controlled pH in accordance with the invention the loss of peroxide can be very substantially reduced. A similar advantage is obtained when adding these partial salt stabilizers to peroxide before or during final use, especially when the peroxide is to be used at high temperatures. For instance in textile or wood pulp bleaching at ordinary or elevated temperatures, expoxidation, oxidation or other reactions with hydrogen peroxide, the present stabilizers are effective in reducing extraneous peroxide losses without interfering with the desired conversion of the peroxide when the pH is controlled as previously indicated.

It will thus be seen that the invention is broadly applicable and can be carried out in various ways. It is not restricted to the examples, which have been given by way of illustration only, nor by and theory proposed in explanation of the improved results which are obtained.

I claim as my invention:

1. Hydrogen peroxide composition consisting essentially of aqueous hydrogen peroxide and stabilizer therefor containing sufficient water-soluble partially neutralized N,N-(dicarboxyalkyl)amino-substituted carbocyclic compound having a saturated carbocyclic ring with at least two adjacent ring carbon atoms each directly linked to the nitrogen atom of a group of the formula

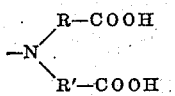

in which R and R' represent alkylene radicals of 1 to 2 carbon atoms, to enhance the stability of the hydrogen peroxide, the proportion of carboxylic acid groups neutralized being only such that the pH of the solution corresponds to about 2.0 to 5.0 in 35% peroxide.

2. A stable aqueous hydrogen peroxide solution in accordance with claim 1 wherein said partially neutralized compound is a member of the group consisting of the partial alkali metal and ammonium salts.

3. Aqueous hydrogen peroxide of at least 6% concentration by weight consisting essentially of hydrogen peroxide solution and stabilizer therefor containing at least 1 milligram per liter of water-soluble partially neutralized polyaminocycloalkane polyacetic acid of the formula

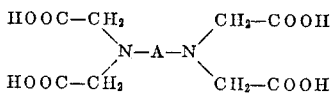

wherein A represents a cycloalkane radical having the two

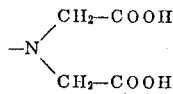

groups directly attached to adjacent ring carbon atoms to enhance the stability of the hydrogen peroxide, the proportion of carboxylic acid groups neutralized being only that which makes the true aqueous equivalent pH correspond to about 4.0 to 5.0.

4. Aqueous hydrogen peroxide in accordance with claim 3 wherein the partially neutralized polyaminocycloalkane polyacetic acid contains a monocyclic alkane hydrocarbon ring of 4 to 9 carbon atoms.

5. Aqueous hydrogen peroxide solution consisting essentially of said aqueous hydrogen peroxide together with dissolved stabilizer therefor containing about 3 to about 1000 milligrams per liter of alkali metal salt of 1,2-diaminocyclohexane-N,N'-tetraacetic acid having only sufficient of the acetic acid groups neutralized to make the pH of the solution correspond to about 2.0 to 5.0 in 35% hydrogen peroxide.

6. Aqueous hydrogen peroxide of about 35% weight concentration consisting essentially of said aqueous peroxide and stabilizer therefor containing sufficient water-soluble partially neutralized polyaminocycloalkane polyacetic acid of the formula

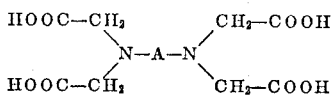

wherein A represents a cycloalkane radical having the two

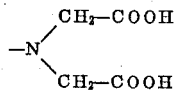

groups directly attached to adjacent ring carbon atoms, to enhance the stability of the hydrogen peroxide, the proportion of acetic acid groups neutralized being only that which makes the pH of the solution about 2.0 to 5.0.

7. Aqueous hydrogen peroxide of about 35% weight concentration consisting essentially of said aqueous peroxide and stabilizer containing about 3 to about 1000 milligrams per liter of soluble partially neutralized 1,2-diaminocycloalkane-N,N'-tetraacetic acid containing 4 to 18 carbon atoms in the cycloalkane radical and having only sufficient of the carboxyl groups neutralized to make the pH of the solution about 2.0 to 5.0.

8. Aqueous hydrogen peroxide solution consisting essentially of said aqueous hydrogen peroxide together with dissolved stabilizer therefor containing about 3 to about 1000 milligrams per liter of a water-soluble ammonium salt of 1,2-diaminocyclohexane-N,N-tetraacetic acid in which the proportion of acetic acid groups neutralized is only that which makes the pH of the solution about 2.0 to 5.0.

9. Aqueous hydrogen peroxide solution consisting essentially of said aqueous hydrogen peroxide together with dissolved stabilizer therefor containing about 3 to about 1000 milligrams per liter of a sodium salt of 1,2-diaminocyclopentane-N,N'-tetraacetic acid in which the proportion of acetic acids groups neutralized is only that which makes the pH of the solution about 2.0 to 5.0.

10. Aqueous hydrogen peroxide solution consisting essentially of said aqueous hydrogen peroxide together with dissolved stabilizer therefor containing about 3 to about 1000 milligrams per liter of a water-soluble partially neutralized 1,2-diaminoperhydronaphthalene-N,N'-tetraacetic acid in which the proportion of acetic acid groups neutralized is only that which makes the true aqueous equivalent pH of the solution about 4.0 to 5.0.

References Cited by the Examiner

UNITED STATES PATENTS

| | | | |
|---|---|---|---|
| 2,519,708 | 8/50 | Sehlapfer et al. | 260—514 |
| 2,961,306 | 11/60 | Johnston | 23—207.5 |
| 3,076,701 | 2/63 | Bersworth | 23—107 |

FOREIGN PATENTS 721,317  6/42  Germany.

OTHER REFERENCES

Chaberek et al.: "Organic Sequestering Agents," pp. 263–266, 275.

MAURICE A. BRINDISI, *Primary Examiner.*